(12) United States Patent
Suzuki

(10) Patent No.: US 9,765,553 B2
(45) Date of Patent: Sep. 19, 2017

(54) VEHICLE

(71) Applicant: YAMAHA HATSUDOKI KABUSHIKI KAISHA, Iwata-shi, Shizuoka (JP)

(72) Inventor: Yasuhiro Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 7 days.

(21) Appl. No.: 14/809,294

(22) Filed: Jul. 27, 2015

(65) Prior Publication Data

US 2016/0032625 A1    Feb. 4, 2016

(30) Foreign Application Priority Data

Jul. 29, 2014 (JP) ................. 2014-153803

(51) Int. Cl.
| E05B 79/22 | (2014.01) |
| E05B 85/12 | (2014.01) |
| E05B 85/24 | (2014.01) |
| B60J 5/04  | (2006.01) |

(52) U.S. Cl.
CPC ............ *E05B 79/22* (2013.01); *B60J 5/0487* (2013.01); *E05B 85/12* (2013.01); *E05B 85/243* (2013.01)

(58) Field of Classification Search
CPC ........ B60J 5/0487; E05B 79/22; E05B 85/12; E05B 85/243
USPC ........ 296/146.1, 146.5, 146.6, 146.7, 190.11
See application file for complete search history.

(56) References Cited

U.S. PATENT DOCUMENTS

| 4,049,305 A * | 9/1977 | Zetterlund ............ B60J 5/0487 |
| | | 292/336.3 |
| 4,889,373 A * | 12/1989 | Ward ................... E05B 13/002 |
| | | 292/336.3 |
| 5,377,450 A * | 1/1995 | Varajon .................. E05B 85/12 |
| | | 292/336.3 |
| 8,091,933 B1 * | 1/2012 | Hemann ............... E05B 63/185 |
| | | 292/198 |
| 8,556,331 B2 * | 10/2013 | Tsumiyama ........... B60J 5/0487 |
| | | 296/146.5 |
| 9,016,759 B2 * | 4/2015 | Ricketts .................. B60R 21/06 |
| | | 296/146.1 |
| 2005/0146147 A1 * | 7/2005 | Niskanen ............ E05B 47/0009 |
| | | 292/336.3 |
| 2009/0013501 A1 * | 1/2009 | Tomiji .................... E05B 85/12 |
| | | 16/412 |
| 2011/0062748 A1 * | 3/2011 | Kaita ..................... B60J 5/0487 |
| | | 296/146.9 |
| 2012/0161427 A1 * | 6/2012 | Tsumiyama ........... B60J 5/0487 |
| | | 280/781 |

(Continued)

FOREIGN PATENT DOCUMENTS

JP    2009-241817 A    10/2009

*Primary Examiner* — Gregory Blankenship
(74) *Attorney, Agent, or Firm* — Keating and Bennett, LLP

(57) ABSTRACT

A vehicle includes an opening between an upper frame and a door when the vehicle is seen from the side. The vehicle includes a lever pivotally attached to a portion of an inner wall of the door that is located above a middle position of the door in an up-down direction and forward of a latch mechanism, and an interlocking shaft linked to the lever and the latch mechanism. The interlocking shaft is configured to move in a vehicle front-rear direction as the lever is pivoted, thus interlocking the latch mechanism with the lever.

12 Claims, 11 Drawing Sheets

(56) References Cited

U.S. PATENT DOCUMENTS

| | | | | |
|---|---|---|---|---|
| 2012/0161468 A1* | 6/2012 | Tsumiyama | ............ | B60J 5/0487 296/146.11 |
| 2013/0133384 A1* | 5/2013 | Pickar | ..................... | E05B 81/25 70/91 |
| 2013/0319785 A1* | 12/2013 | Spindler | .............. | B62D 23/005 180/292 |
| 2014/0013667 A1* | 1/2014 | Amagai | .................. | E05B 79/20 49/301 |
| 2015/0259011 A1* | 9/2015 | Deckard | ............. | B62D 21/183 280/781 |
| 2016/0032625 A1* | 2/2016 | Suzuki | ................... | B60J 5/0487 296/146.5 |

\* cited by examiner

VEHICLE

The present application claims priority to Japanese Patent Application No. 2014-153803, filed on Jul. 29, 2014, the disclosure of which is hereby incorporated by reference in its entirety.

BACKGROUND OF THE INVENTION

1. Field of the Invention

The present invention relates to a vehicle including a door that is able to be opened/closed.

2. Description of the Related Art

Vehicles suitable for running on uneven terrain, such as ROVs (Recreational Off-highway Vehicles) and side-by-side ATVs (All Terrain Vehicles) are known in the art. Some vehicles of this type include upper frames located over the seats when the vehicle is seen from the side and extending in the vehicle front-rear direction, and doors that are able to be opened/closed under the upper frames beside the seats. With such vehicles, there is no window glass between the upper frames and the doors, and the space therebetween is open all the time. Therefore, a passenger is able to put his/her hand inside the vehicle from outside the door without opening the door. Based on this characteristic, vehicles have been proposed in the art, in which the lever to open/close the door is provided only on the inner side of the door. Japanese Laid-Open Patent Publication No. 2009-241817 discloses such a vehicle.

The vehicle disclosed in Japanese Laid-Open Patent Publication No. 2009-241817 includes a door whose front end portion is supported on a vehicle body frame by a hinge mechanism, and a door lock unit that locks the door in the closed position. The door lock unit includes a rotatable shaft extending in the vehicle front-rear direction, an open/close lever supported on the shaft so that the open/close lever rotates together with the shaft, and a latch mechanism attached to one end of the shaft. The open/close lever is located in an upper portion of an inner wall of the door, and is easily operated from outside the door.

The latch mechanism of the door lock unit locks the door by engaging with a latch striker fixed on the vehicle body frame, or the like. While the latch striker is located to the side of the seat, the latch striker is preferably located rearward of the front end of the seat so that the latch striker will not be in the way of a passenger getting into/out of the seat. In the vehicle disclosed in Japanese Laid-Open Patent Publication No. 2009-241817, the vehicle body frame includes a hip guard located on the side of a rear portion of the seat, and the latch striker is fixed to the hip guard.

The latch mechanism engages with the latch striker when the door is closed. Therefore, if the latch striker is located rearward of the front end of the seat, the latch mechanism needs to be located rearward of the front end of the seat when the door is closed. With the door lock unit disclosed in Japanese Laid-Open Patent Publication No. 2009-241817, the latch mechanism is attached to one end of the shaft, which rotates together with the open/close lever. If the length of the shaft is increased, the action of the open/close lever and the action of the latch mechanism will likely be out of sync with each other. Therefore, it is difficult to increase the length of the shaft, and the open/close lever needs to be located in the vicinity of the latch mechanism. For the sake of convenience for a passenger getting on/off the vehicle, the latch mechanism is preferably located relatively close to the rear side. Therefore, for a vehicle such as that disclosed in Japanese Laid-Open Patent Publication No. 2009-241817, the open/close lever needs to be located relatively close to the rear side.

The position of the open/close lever that is easy for a passenger seated in the seat to operate the open/close lever may vary depending on the specifications of the vehicle. With the vehicle disclosed in Japanese Laid-Open Patent Publication No. 2009-241817, however, the open/close lever needs to be located relatively close to the rear side. Thus, it may not be possible to locate the open/close lever at such a position that the open/close lever is operated easily.

SUMMARY OF THE INVENTION

Preferred embodiments of the present invention, which have been made in view of the problems set forth above, provide a vehicle including a lever to open/close a door provided on the inner side of the door, wherein a latch striker is unlikely to be in the way of a passenger getting on/off the vehicle, and the lever is easily operated by a passenger while being seated in the seat.

A vehicle according to a preferred embodiment of the present invention includes a seat for a passenger to sit in; an upper frame located over the seat when the vehicle is seen from a side, the upper frame extending in a vehicle front-rear direction; and a door located under the upper frame and to a side of the seat, the door including an inner wall facing the seat and an outer wall located on an opposite side from the inner wall, and an opening provided between the upper frame and the door when the vehicle is seen from the side. The vehicle further includes a hinge mechanism attached to a front end portion of the door, the hinge mechanism supporting the door so that the door pivots in a vehicle left-right direction; a latch mechanism attached to the door; a lever pivotally attached to a portion of the inner wall of the door that is above a middle position of the door in an up-down direction and forward of the latch mechanism; and an interlocking shaft extending in the vehicle front-rear direction and including a first link portion linked to the lever and a second link portion linked to the latch mechanism, wherein the interlocking shaft is configured to move in the vehicle front-rear direction as the lever is pivoted, thus interlocking the latch mechanism with the lever.

With the vehicle set forth above, since the lever and the latch mechanism are linked together by the interlocking shaft extending in the vehicle front-rear direction, the lever does not always need to be located in the vicinity of the latch mechanism. This allows the lever to be located relatively close to the front side while locating the latch striker that engages with the latch mechanism relatively close to the rear side. This allows the lever to be located at such a position that the lever is easily operated by a passenger seated in the seat while locating the latch striker at such a position that the latch striker will not be in the way of a passenger getting on/off the vehicle. Where the latch mechanism and the lever are interlocked together via the pivotal movement of the interlocking shaft about the central axis of the interlocking shaft, and where the interlocking shaft is long, even a slight bend of the interlocking shaft can cause the action of the lever and the action of the latch mechanism to be out of sync with each other. With the vehicle set forth above, however, the interlocking shaft is configured so as to interlock the latch mechanism and the lever together via its movement in the vehicle front-rear direction (in other words, in the axial direction of the interlocking shaft) following the pivotal movement of the lever. Therefore, even if the interlocking shaft is somewhat bent, the action of the lever and the action of the latch mechanism will not be out of sync with each other. Therefore, even if the interlocking shaft is long, the action of the lever and the action of the latch mechanism will not be out of sync with each other. With the vehicle set forth above, there is no restriction on the length of the interlocking shaft. Thus, there is provided a vehicle in which the lever to open/close the door is provided on the inner side of the door, wherein the latch striker is unlikely to be in the way of a passenger getting on/off the vehicle, and the lever is easily operated by a passenger while being seated in the seat.

According to a preferred embodiment of the present invention, the inner wall of the door includes a depressed portion, and the lever is attached to the depressed portion.

With the preferred embodiment set forth above, it is possible to reduce the amount by which the lever projects from the inner wall of the door. Therefore, the lever is unlikely to be in the way of a passenger while the vehicle is running, for example.

According to another preferred embodiment of the present invention, the lever is located closer to the outer wall of the door than a peripheral portion of the depressed portion of the inner wall of the door.

With the preferred embodiment set forth above, since the lever does not project from the inner wall of the door, the lever will not be in the way of a passenger while the vehicle is running, for example.

According to another preferred embodiment of the present invention, the door includes a first upper edge and a second upper edge extending, at an angle with respect to the first upper edge, continuously from a rear end of the first upper edge. At least a portion of the lever is located under the second upper edge.

With the preferred embodiment set forth above, since the second upper edge extends at an angle with respect to the first upper edge continuously from the rear end of the first upper edge, the second upper edge is easily recognized from outside the door. While the lever is provided on the inner wall, at least a portion of the lever is located under the second upper edge. This enables the position of the lever to be easily recognized from outside the door. Therefore, the lever is easily operated from outside the door.

According to another preferred embodiment of the present invention, the lever includes a lever body linked to the first link portion of the interlocking shaft, and a support shaft extending in a vertical direction to pivotally support the lever body.

If the lever body is pivotally supported by the support shaft extending in the vehicle front-rear direction, the lever body may be difficult to operate for a passenger seated in the seat depending on the difference in height between the seat and the lever body. With the preferred embodiment set forth above, however, it is possible to actuate the latch mechanism by pivoting the lever body to the left and right. Therefore, a passenger is able to easily operate the lever while being seated in the seat.

According to another preferred embodiment of the present invention, the lever body includes a handle extending forward of the support shaft.

With the preferred embodiment set forth above, a passenger is able to actuate the latch mechanism by holding and pivoting the handle. Therefore, a passenger is able to easily operate the lever while being seated in the seat.

According to another preferred embodiment of the present invention, the lever includes a lever body linked to the first link portion of the interlocking shaft, and a support shaft extending in a vehicle width direction to pivotally support the lever body.

With the preferred embodiment set forth above, a passenger easily operates the lever while being seated in the seat.

According to another preferred embodiment of the present invention, the door includes an inner wall member including the inner wall, and an outer wall member including the outer wall. The inner wall member and the outer wall member are assembled together.

With the preferred embodiment set forth above, the door is preferably manufactured by attaching the lever and the latch mechanism to the inner wall member, and assembling together the inner wall member and the outer wall member. Therefore, the door is easily manufactured.

According to another preferred embodiment of the present invention, the interlocking shaft is located between the inner wall member and the outer wall member.

With the preferred embodiment set forth above, the interlocking shaft is protected by the inner wall member and the outer wall member.

According to another preferred embodiment of the present invention, the inner wall member includes an opposing wall opposing the outer wall member, and the opposing wall includes a depressed portion. The interlocking shaft is located in the depressed portion of the opposing wall.

With the preferred embodiment set forth above, since the interlocking shaft is located in the depressed portion of the opposing wall, the interlocking shaft is protected more reliably.

According to another preferred embodiment of the present invention, the inner wall member and the outer wall member are each made of a resin material.

With the preferred embodiment set forth above, it is possible to reduce the weight of the door.

According to another preferred embodiment of the present invention, the inner wall member and the outer wall member are made of different kinds of resin materials.

With the preferred embodiment set forth above, it is possible to use a suitable resin material for each of the inner wall member and the outer wall member, thus realizing a more desirable door.

According to another preferred embodiment of the present invention, when the door is closed, a front end of the lever is located rearward of a front end of the seat and forward of a middle position of the seat in the vehicle front-rear direction.

With the preferred embodiment set forth above, the lever is located at such a position that the lever is easily operated by a passenger seated in the seat. Therefore, a passenger easily operates the lever while being seated in the seat.

According to preferred embodiments of the present invention, there is provided a vehicle in which the lever to open/close the door is provided on the inner side of the door, wherein the latch striker is unlikely to be in the way of a passenger getting on/off the vehicle, and the lever is easily operated by a passenger while being seated in the seat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
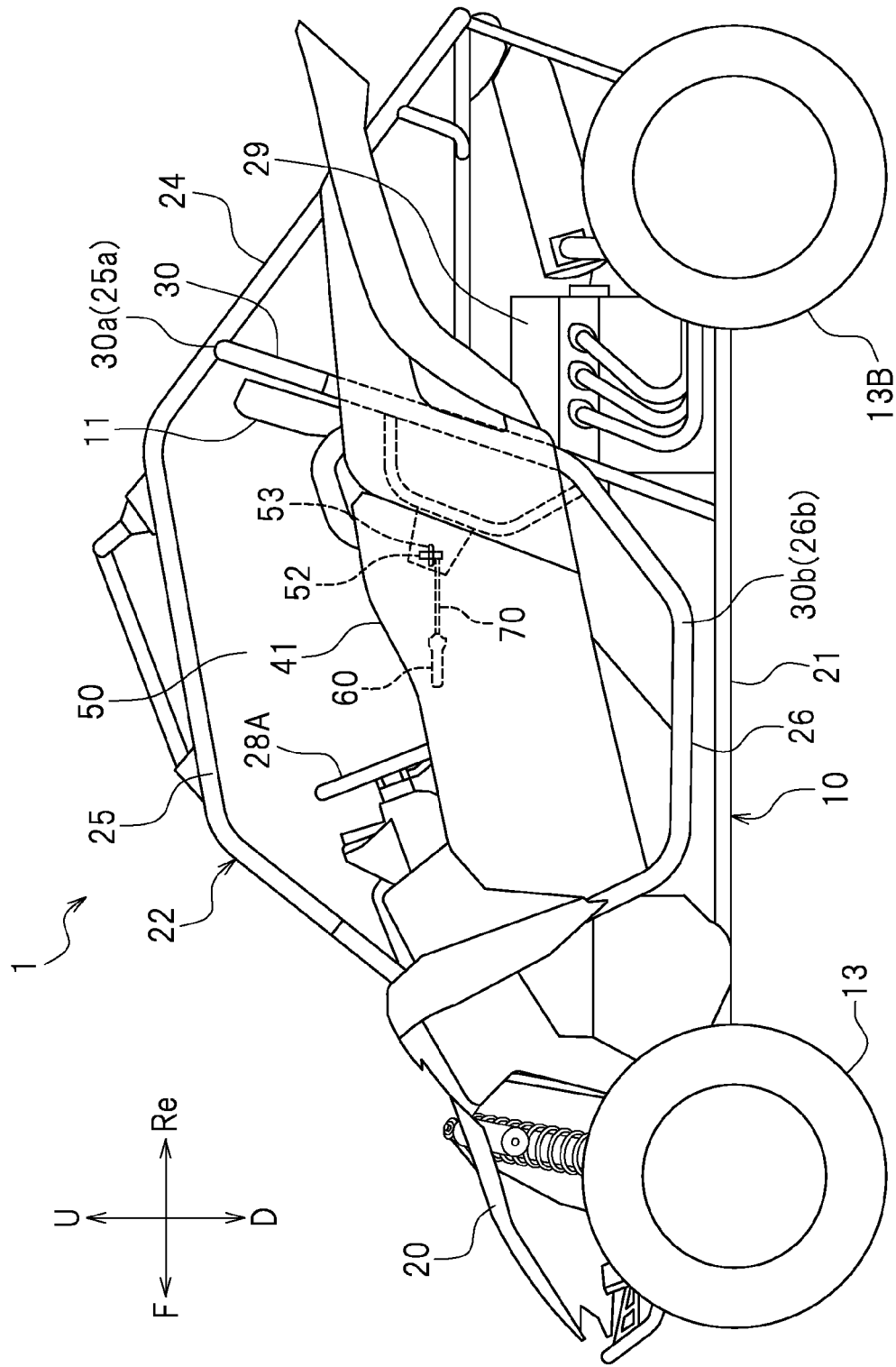
FIG. 1 is a left side view showing an ROV of a preferred embodiment of the present invention.
Figure 2:
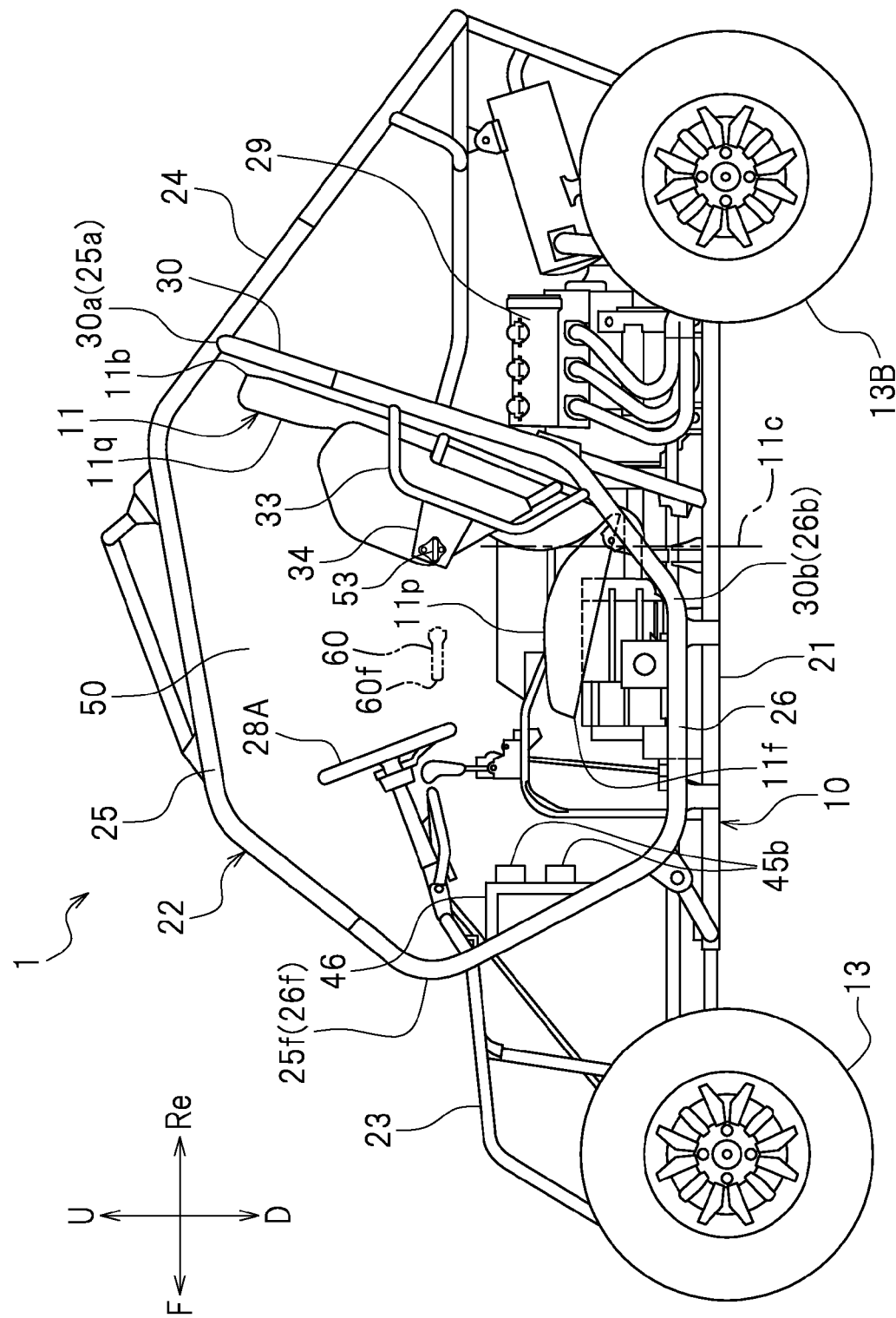
FIG. 2 is a left side view showing the ROV, with doors, etc., removed.

Preferred embodiments of the present invention will now be described. As shown in FIGS. 1 and 2, a vehicle of the present preferred embodiment preferably is an ROV 1, for example. The ROV 1 is a vehicle suitable for running on uneven terrain. Note, however, that the vehicle of the present invention is not limited to an ROV, but may be any vehicle including a seat for a passenger to sit in, e.g., a side-by-side ATV.

The terms front, rear, left, right, up, and down, as used in the description below, refer to these directions as seen from a passenger seated in a seat of the ROV 1, unless specified otherwise. The terms up and down refer to these directions in the vertical direction while the ROV 1 is stationary on a horizontal surface. The designations F, Re, L, R, U and D, as used in the figures, refer to front, rear, left, right, up, and down, respectively.

Figure 3:
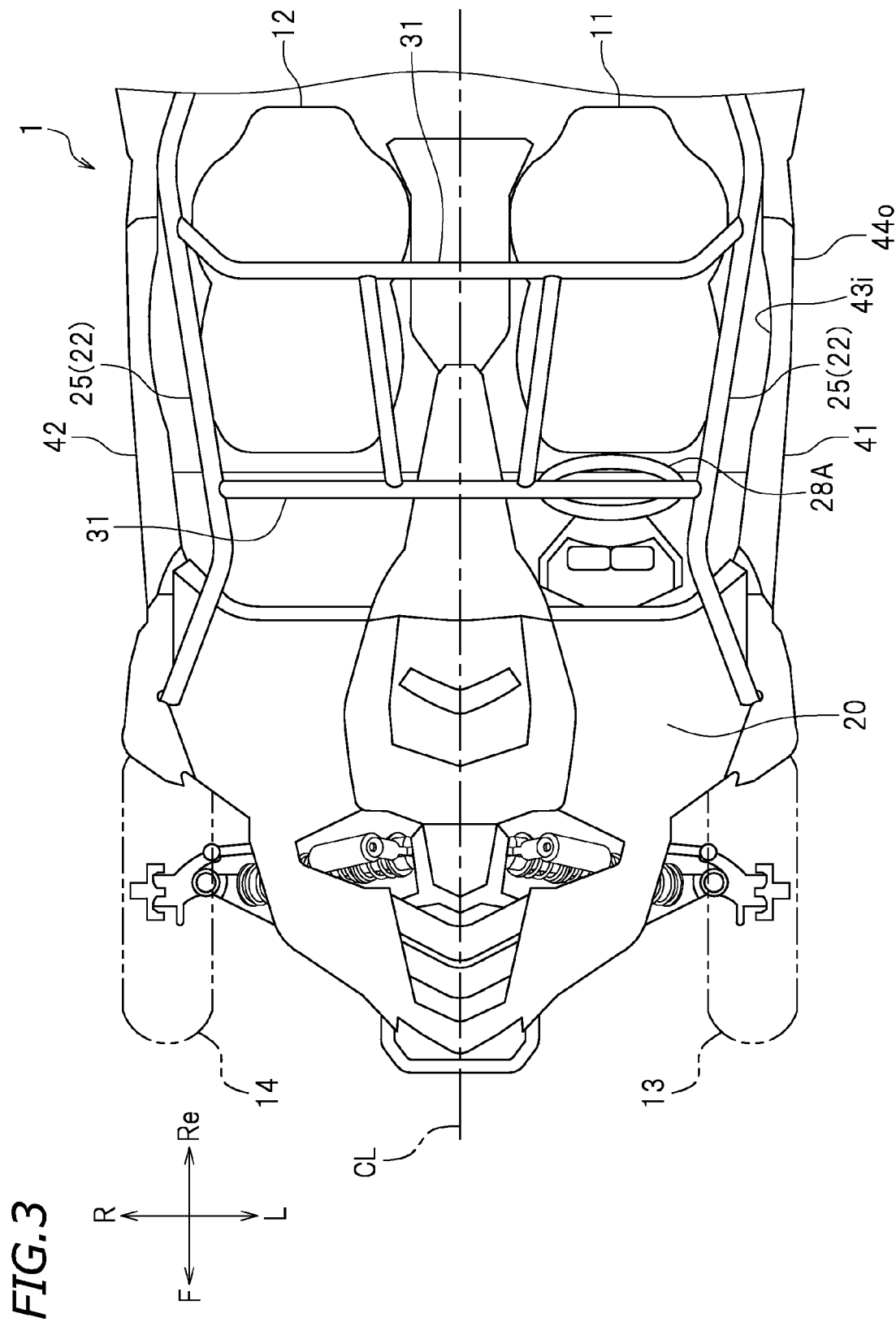
FIG. 3 is a plan view showing a portion of the ROV.

As shown in FIGS. 1 to 3, the ROV 1 includes a vehicle body frame 10, an engine 29, a left seat 11, and a right seat 12 for passengers to sit in, a left front wheel 13, a right front wheel 14, a left rear wheel 13B, and a right rear wheel (not shown). The ROV 1 further includes a left door 41 located to the left of the left seat 11, and a right door 42 located to the right of the right seat 12. A steering handle 28A is located in front of the left seat 11. Note, however, that the steering handle 28A may be located in front of the right seat 12. A front cover 20 is located in front of the steering handle 28A. The front cover 20 is located over the left front wheel 13 when the vehicle is seen from the side.

There is no particular limitation on the configuration of the vehicle body frame 10. In the present preferred embodiment, as shown in FIG. 2, the vehicle body frame 10 includes left and right main frames 21 extending in the vehicle front-rear direction, left and right center frames 22 located above the left and right main frames 21, respectively, left and right front frames 23 (see FIG. 2) located forward of the left and right center frames 22, respectively, and left and right rear frames 24 located rearward of the left and right center frames 22, respectively.

The center frame 22 includes an upper frame 25, a lower frame 26, and a rear center frame 30. The upper frame 25 extends in the vehicle front-rear direction. Note that the phrase "extend in the vehicle front-rear direction" as used herein indicates that the upper frame 25 as a whole extends in the vehicle front-rear direction. A portion of the upper frame 25 is preferably bent, as in the present preferred embodiment. The upper frame 25 may be straight. The upper frame 25 is located over the lower frame 26. As shown in FIG. 2, a front end portion 25f of the upper frame 25 is linked to a front end portion 26f of the lower frame 26. An upper end portion 30a of the rear center frame 30 is connected to a rear end portion 25a of the upper frame 25, and a lower end portion 30b of the rear center frame 30 is connected to a rear end portion 26b of the lower frame 26. The upper frame 25, the lower frame 26, and the rear center frame 30 together define a passenger space as seen from the side of the vehicle.

Each of the upper frame 25, the lower frame 26, and the rear center frame 30 may be a single member or a plurality of members connected together. At least a portion of the upper frame 25 and at least a portion of the lower frame 26 may be integral. At least a portion of the upper frame 25 and at least a portion of the rear center frame 30 may be integral. At least a portion of the lower frame 26 and at least a portion of the rear center frame 30 may be integral. The upper frame 25, the lower frame 26, and the rear center frame 30 may be integral, or include a plurality of members connected together.

As shown in FIG. 3, the left center frame 22 and the right center frame 22 are linked together by a plurality of cross members 31 extending in the left-right direction. Although not shown in the figures, the left main frame 21 and the right main frame 21 are linked together by a plurality of cross members extending in the left-right direction.

The left seat 11 and the right seat 12 are supported on the vehicle body frame 10. As shown in FIG. 2, the left seat 11 and the right seat 12 are located under the upper frame 25 as seen from the side of the vehicle. In other words, the upper frame 25 is located over the left seat 11 and the right seat 12 when the vehicle is seen from the side. The left seat 11 and the right seat 12 are located over the lower frame 26 and in front of the rear center frame 30. The left seat 11 and the right seat 12 are located within the passenger space as seen from the side of the vehicle. Note, however, that there is no particular limitation on the positions of the left seat 11 and the right seat 12.

As described above, the ROV 1 includes the left door 41 and the right door 42. The left door 41 and the right door 42 are preferably in left-right symmetry with each other. The configuration of the left door 41 and that of the right door 42 are preferably the same, except that they are left-right symmetrical with each other. The left door 41 will now be described in detail, while the description of the right door 42 will be omitted.

As shown in FIG. 1, the door 41 is located under the upper frame 25. As shown in FIG. 3, the door 41 is located to the side of the seat 11. The door 41 is located on the outer side of the seat 11 in the vehicle width direction. Note that the vehicle width direction refers to the left-right direction. The outer side in the vehicle width direction refers to a direction away from the vehicle center line CL. The inner side in the vehicle width direction refers to a direction toward the vehicle center line CL. The door 41 is located to the left of the seat 11.

As shown in FIG. 1, an opening 50 is provided between the upper frame 25 and the door 41 when the vehicle is seen from the side. The opening 50 has a size such that a passenger is able put his/her hand therethrough. In the present preferred embodiment, the length of the opening 50 in the vehicle front-rear direction preferably is greater than or equal to the length of the door 41 in the vehicle front-rear direction. The area of the opening 50 may be greater than the area defined by the outline of the steering handle 28A. The area of the opening 50 may be greater than the area of the door 41. The door 41 preferably has no window glass. There is preferably no window glass between the upper frame 25 and the door 41. Thus, the opening 50 preferably is open all the time. The space between the upper frame 25 and the door 41 preferably is open all the time. A passenger is able put his/her hand inside the door 41 from outside the door 41 through the opening 50.

Note that in the ROV 1, a portion of the opening 50 may be covered as long as there is an opening between the upper frame 25 and the door 41 through which one is able put in his/her hand. For example, a net may be located between the upper frame 25 and the door 41. A sunshade plate, which is sized to cover the opening 50 only partially but not entirely, may be located on the upper frame 25.

Figure 4:
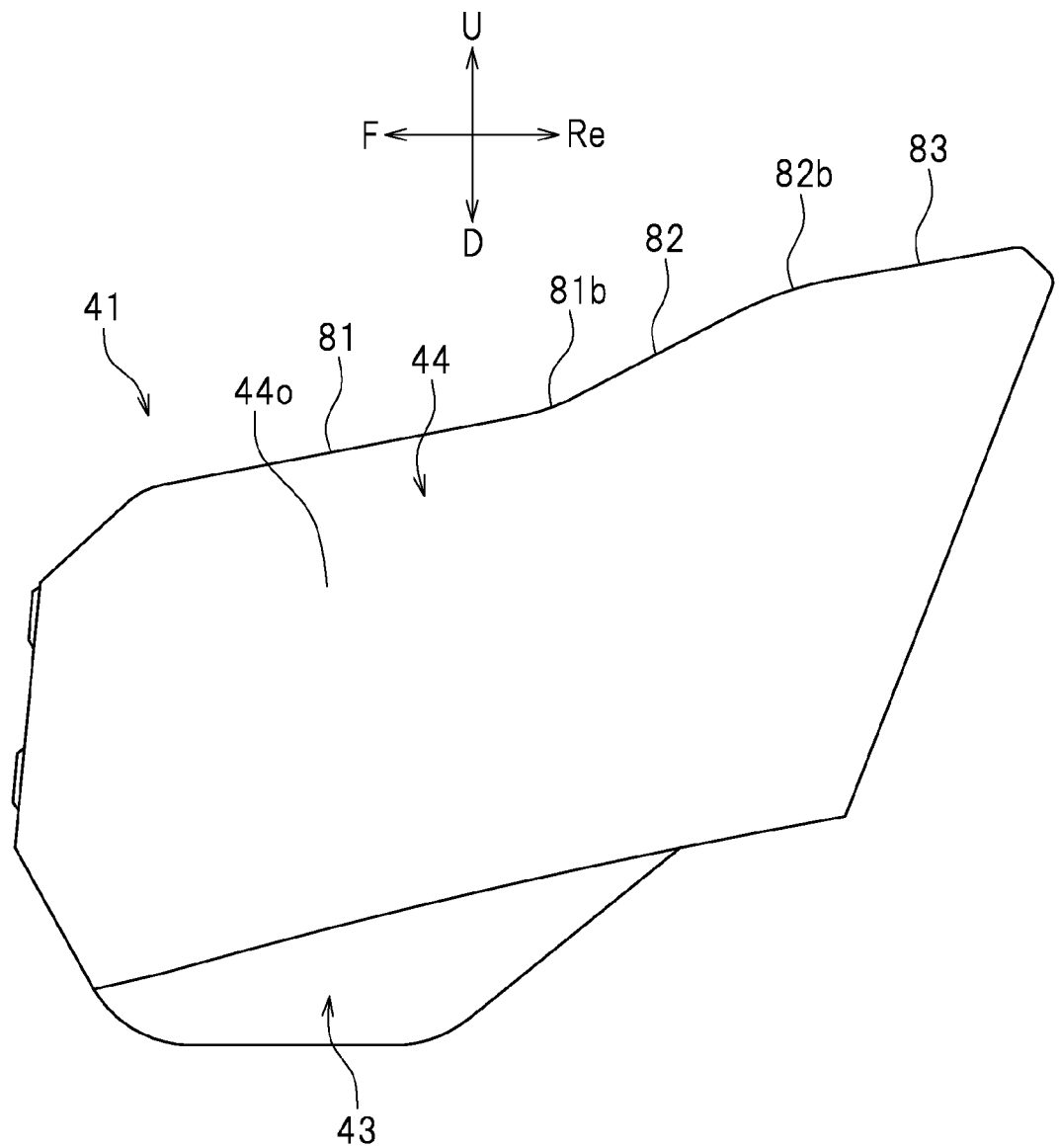
FIG. 4 is a left side view showing a left door.
Figure 5:
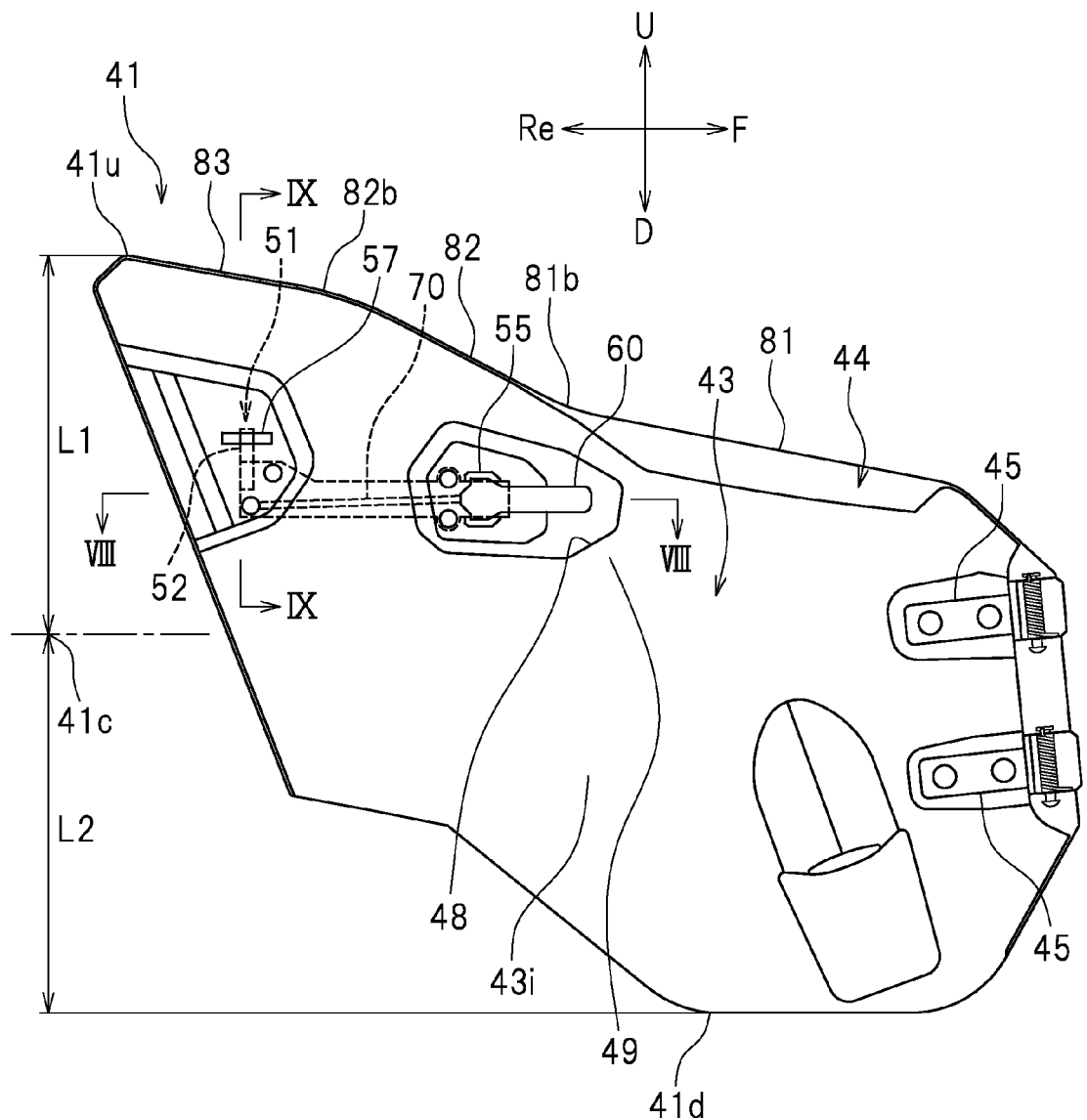
FIG. 5 is a right side view showing the left door.
Figure 6:
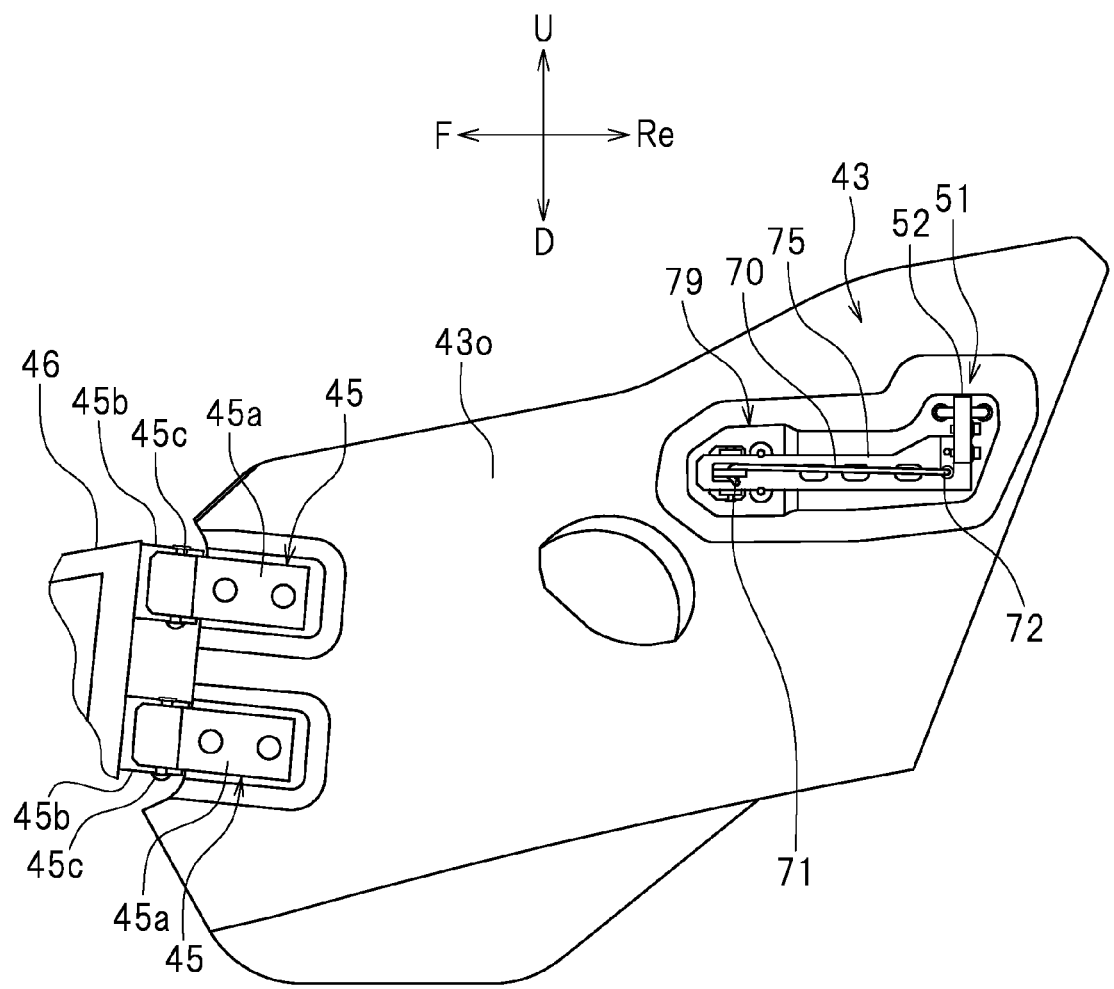
FIG. 6 is a left side view showing an inner wall member of the left door.

FIG. 4 is a left side view showing the door 41, and FIG. 5 is a right side view showing the door 41. FIG. 4 shows the outer side of the door 41, and FIG. 5 shows the inner side of the door 41. While the door 41 in the present preferred embodiment includes a plurality of members, the door 41 may be made of a single member. The door 41 of the present preferred embodiment includes an inner wall member 43 and an outer wall member 44. The inner wall member 43 is located on the inner side in the vehicle width direction with respect to the outer wall member 44. The inner wall member 43 and the outer wall member 44 are assembled together. FIG. 6 shows the door 41 shown in FIG. 4, with the outer wall member 44 removed. That is, FIG. 6 is a left side view of the inner wall member 43, showing the outer side of the inner wall member 43.

The inner wall member 43 and the outer wall member 44 may each include a single member or a plurality of members. The material of the inner wall member 43 and the material of the outer wall member 44 may be the same or different from each other. In the present preferred embodiment, the inner wall member 43 and the outer wall member 44 are preferably each made of a resin material. In the present preferred embodiment, the inner wall member 43 and the outer wall member 44 are preferably made of different kinds of resin materials. The material of the inner wall member 43 is preferably polyethylene (PE), for example, and the material of the outer wall member 44 is preferably polypropylene (PP), for example. Note, however, that there is no particular limitation on the materials of the inner wall member 43 and the outer wall member 44. The inner wall member 43 and/or the outer wall member 44 may be made of other resin materials, metal materials, or other materials.

The inner wall member 43 includes an inner wall 43$i$ (see FIG. 3) facing the seat 11, and an opposing wall 43$o$ opposing the outer wall member 44. The opposing wall 43$o$ is located on the opposite side from the inner wall 43$i$, and is located on the outer side of the inner wall 43$i$ in the vehicle width direction. In the left door 41, the opposing wall 43$o$ is located to the left of the inner wall 43$i$. The outer wall member 44 includes an inside wall 44$i$ opposing the inner wall member 43, and an outer wall 44$o$ located on the opposite side from the inside wall 44$i$. The outer wall 44$o$ is located on the outer side of the inside wall 44$i$ in the vehicle width direction. In the left door 41, the outer wall 44$o$ is located to the left of the inside wall 44$i$. The outer wall 44$o$ is exposed on the left side and visible from the left side of the ROV 1.

The door 41 is configured to be opened/closed, and the door 41 is opened when a passenger gets on/off the vehicle, and remains closed otherwise. As shown in FIG. 6, two hinge mechanisms 45 are provided in the front end portion of the inner wall member 43. As shown in FIG. 2, a bracket 46 is provided on the lower frame 26. As shown in FIG. 6, the hinge mechanism 45 includes a first plate 45$a$ attached to the front end portion of the inner wall member 43, a second plate 45$b$ attached to the bracket 46, and a pin 45$c$ that rotatably links together the first plate 45$a$ and the second plate 45$b$. The door 41 is supported on the vehicle body frame 10 via the hinge mechanism 45 and the bracket 46. The hinge mechanism 45 supports the door 41 so that the door 41 pivots in the vehicle left-right direction. Note that there is no particular limitation on the number, size, and position of the hinge mechanisms 45.

The door 41 includes a lock mechanism 51 to hold the door 41 closed, and a lever 60 to release the lock mechanism 51. The lever 60 is provided only on the inner side of the door 41. No lever to release the lock mechanism 51 is provided on the outer side of the door 41.

The lock mechanism 51 may be any known lock mechanism. In the present preferred embodiment, the lock mechanism 51 includes a latch mechanism 52 attached to the inner wall member 43 of the door 41, and a latch striker 53 provided on the vehicle body frame 10 (see FIG. 2). Any known mechanism may be used for the latch mechanism 52 and the latch striker 53. Since the latch mechanism 52 and the latch striker 53 are known in the art, they will not be described in detail below.

As shown in FIG. 2, an auxiliary frame 33 that is bent to protrude in the forward direction is connected to the rear center frame 30. The bracket 34 is provided on the auxiliary frame 33. The latch striker 53 is fixed to the bracket 34. The latch striker 53 projects outward in the vehicle width direction. That is, the latch striker 53 projects in the leftward direction. The latch mechanism 52 faces the rightward direction.

Figure 7A:
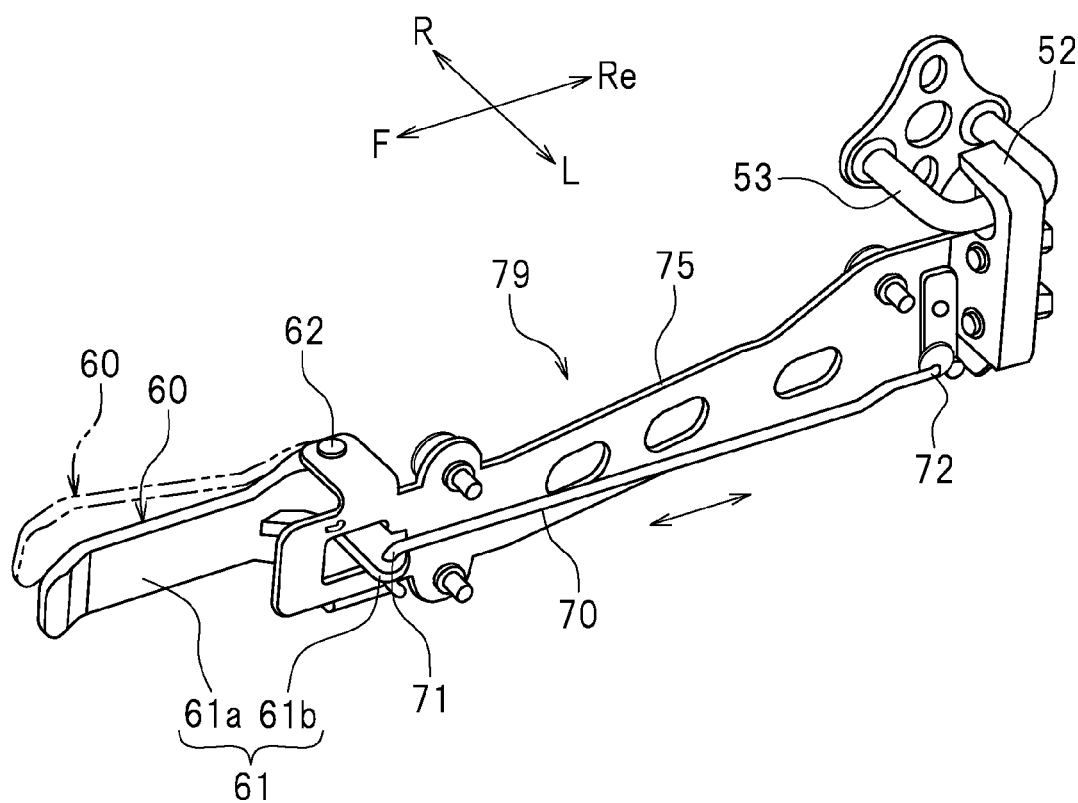
FIG. 7A is a perspective view showing a door lock unit.

FIG. 7A is a perspective view showing a door lock unit 79 provided on the door 41. The door lock unit 79 includes the lever 60, the latch mechanism 52, a support plate 75, and an interlocking shaft 70. As shown in FIG. 7A, the latch mechanism 52 is supported on the support plate 75. The latch mechanism 52 is supported on the rear end portion of the support plate 75. Note, however, that there is no particular limitation on the position where the latch mechanism 52 is supported on the support plate 75.

The lever 60 includes a lever body 61, and a support shaft 62 to pivotally support the lever body 61. The support shaft 62 is attached to the support plate 75. The lever body 61 is operated by a passenger. The lever body 61 includes a handle 61$a$ to be held by a hand of a passenger, and a connecting portion 61$b$ to which the interlocking shaft 70 is attached. The handle 61$a$ extends forward of the support shaft 62. In the present preferred embodiment, the support shaft 62 extends in the vertical direction. Note that the "vertical direction" as used herein is not limited to the vertical direction in the strict sense (i.e., the direction at an angle of 90 degrees with the horizontal plane), but includes directions slightly inclined from the strictly vertical direction. The lever body 61 is supported on the support shaft 62 so that the lever body 61 pivots in the vehicle left-right direction.

As shown in FIG. 5, the lever 60 is attached to a portion of the inner wall 43$i$ of the door 41 that is located above a middle position 41$c$ of the door 41 in the up-down direction and forward of the latch mechanism 52. Note that the middle position 41$c$ of the door 41 in the up-down direction refers to a position at which the distance L1 from an upper end 41$u$ of the door 41 and the distance L2 from a lower end 41$d$ of the door 41 are preferably equal or substantially equal to each other (i.e., L1=L2). As the lever 60 is located above the middle position 41$c$, the lever 60 is easily operated from outside the door 41.

As shown in FIG. 2, a front end 60f of the lever 60 is located rearward of a front end 11f of the seat 11 when the door 41 is closed. Also, when the door 41 is closed, the front end 60f of the lever 60 is located forward of a middle position 11c of the seat 11 in the vehicle front-rear direction. Note that the middle position 11c of the seat 11 in the vehicle front-rear direction refers to a position at which the distance from the front end 11f of the seat 11 and the distance from a rear end 11b of the seat 11 are preferably equal to each other with respect to the vehicle front-rear direction. In the present preferred embodiment, the seat 11 includes a seat portion 11p and a backrest 11q. In the present preferred embodiment, when the door 41 is closed, the front end 60f of the lever 60 is located forward of the middle position of the seat portion 11p in the vehicle front-rear direction. The middle position of the seat portion 11p in the vehicle front-rear direction refers to a position at which the distance from the front end of the seat portion 11p and the distance from the rear end of the seat portion 11p are preferably equal or substantially equal to each other with respect to the vehicle front-rear direction.

As shown in FIG. 7A, the lever 60 and the latch mechanism 52 are linked together by the interlocking shaft 70. The interlocking shaft 70 extends in the vehicle front-rear direction. The interlocking shaft 70 includes a first link portion 71 linked to the connecting portion 61b of the lever body 61 of the lever 60, and a second link portion 72 linked to the latch mechanism 52. In the present preferred embodiment, the first link portion 71 defines the front end portion of the interlocking shaft 70, and the second link portion 72 defines the rear end portion of the interlocking shaft 70. The interlocking shaft 70 may extend straight or may include a bent portion. While the interlocking shaft 70 is made of metal in the present preferred embodiment, there is no particular limitation on the material of the interlocking shaft 70.

As the lever 60 pivots about the support shaft 62, the interlocking shaft 70 moves in the vehicle front-rear direction. As the interlocking shaft 70 moves in the vehicle front-rear direction, the latch mechanism 52 is engaged with or disengaged from the latch striker 53. Specifically, when the lever 60 pivots to the right about the support shaft 62, the interlocking shaft 70 moves forward by being pulled forward by the lever 60. When the interlocking shaft 70 moves forward while the latch mechanism 52 is engaged with the latch striker 53, the latch mechanism 52 is disengaged from the latch striker 53. This unlocks the door 41.

Figure 7B:
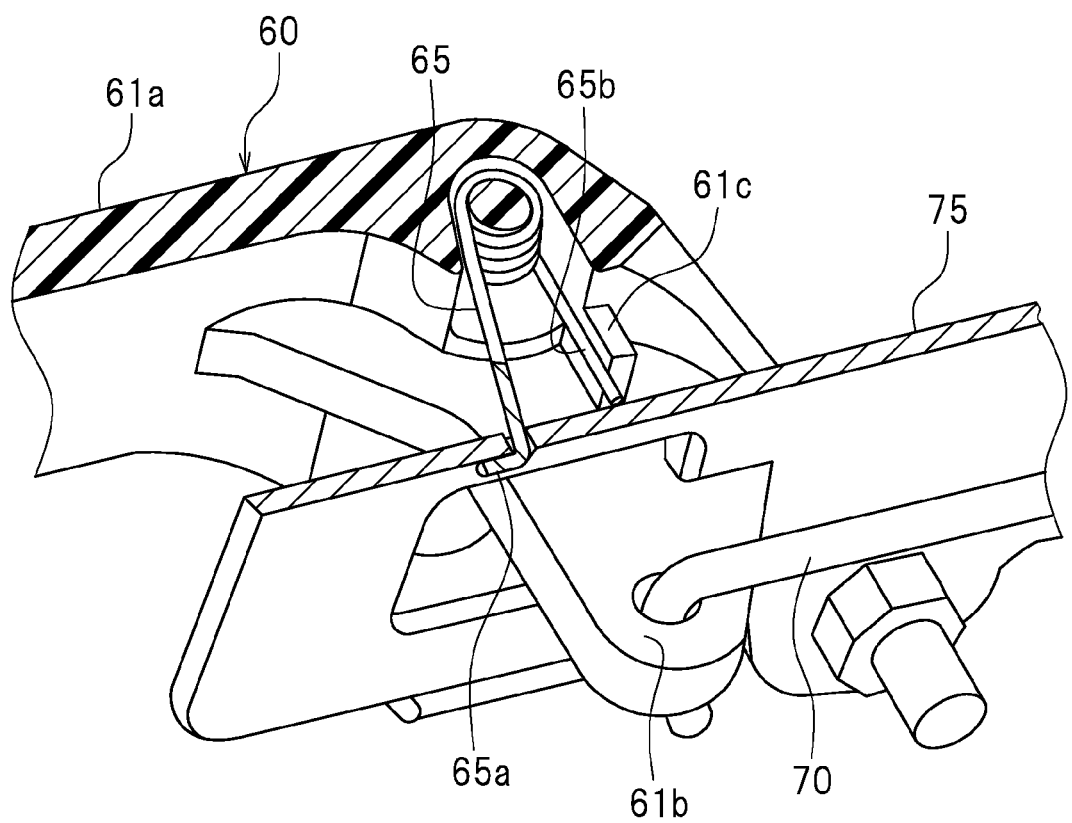
FIG. 7B is a cross-sectional view showing a portion of the door lock unit on an enlarged scale.

On the other hand, when the lever 60 pivots to the left about the support shaft 62, the interlocking shaft 70 moves backward by being pushed backward by the lever 60. When the interlocking shaft 70 moves backward, the latch mechanism 52 is engaged with the latch striker 53. When the door 41 is closed in this state, the latch mechanism 52 is engaged with the latch striker 53, locking the door 41. As shown in FIG. 7B, the lever 60 is provided with a spring 65 urging the lever 60 to pivot to the left. Therefore, if a passenger releases the lever 60, the lever 60 pivots to the left by the force of the spring 65, returning to the initial position shown in FIG. 7A. While the spring 65 is preferably a torsion spring in the present preferred embodiment, there is no particular limitation on the type of the spring 65 for urging the lever 60 toward the initial position. As shown in FIG. 7B, one end 65a of the spring 65 engages with the support plate 75, and the other end 65b of the spring 65 engages with an engaging wall 61c of the lever 60.

Figure 8:
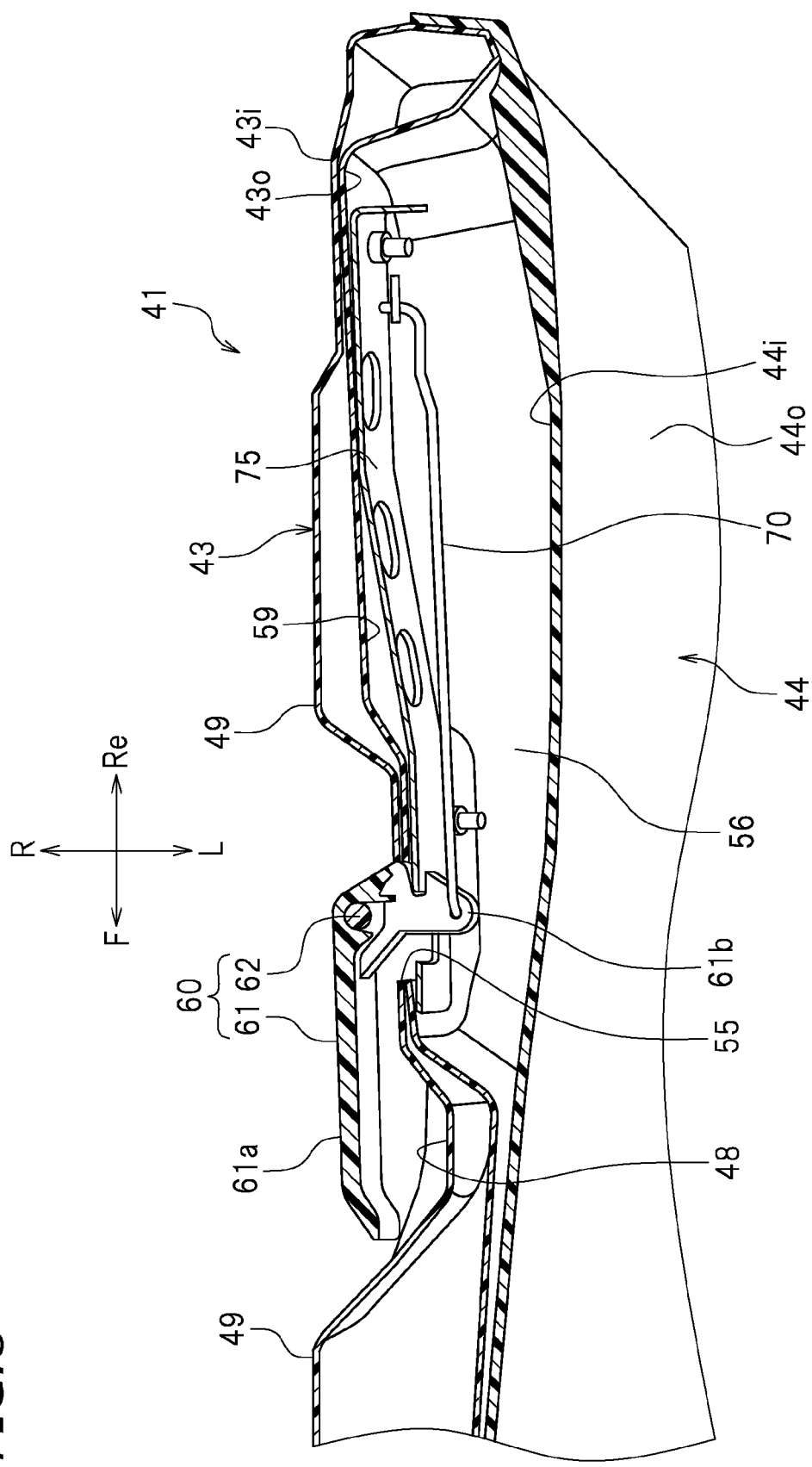
FIG. 8 is a perspective view including a cross section along VIII-VIII line of FIG. 5.

As shown in FIG. 8, the inner wall 43i of the door 41 includes a depressed portion 48. The depressed portion 48 is depressed toward the outside in the vehicle width direction. In the left door 41, the depressed portion 48 is depressed toward the left. As shown in FIG. 5, the lever 60 is accommodated in the depressed portion 48. The lever 60 is located in the depressed portion 48. In the present preferred embodiment, as shown in FIG. 8, the lever 60 is located on the outer side in the vehicle width direction with respect to a peripheral portion 49 of the depressed portion 48 of the inner wall 43i of the door 41. The lever 60 is located closer to the outer wall 44o than the peripheral portion 49 of the depressed portion 48. In the left door 41, the lever 60 is located leftward of the peripheral portion 49 of the depressed portion 48. The lever 60 does not project inward in the vehicle width direction with respect to the peripheral portion 49. Note, however, that there is no particular limitation on the position of the lever 60. A portion of or the entire lever 60 may be located inward in the vehicle width direction with respect to the peripheral portion 49.

As shown in FIGS. 5 and 8, the inner wall member 43 of the door 41 includes a hole 55 therein to allow the connecting portion 61b of the lever 60 to pass therethrough. The lever 60 is attached to the inner wall member 43 so that the handle 61a is located inward in the vehicle width direction with respect to the hole 55 while the connecting portion 61b is located outward in the vehicle width direction with respect to the hole 55.

Figure 9:
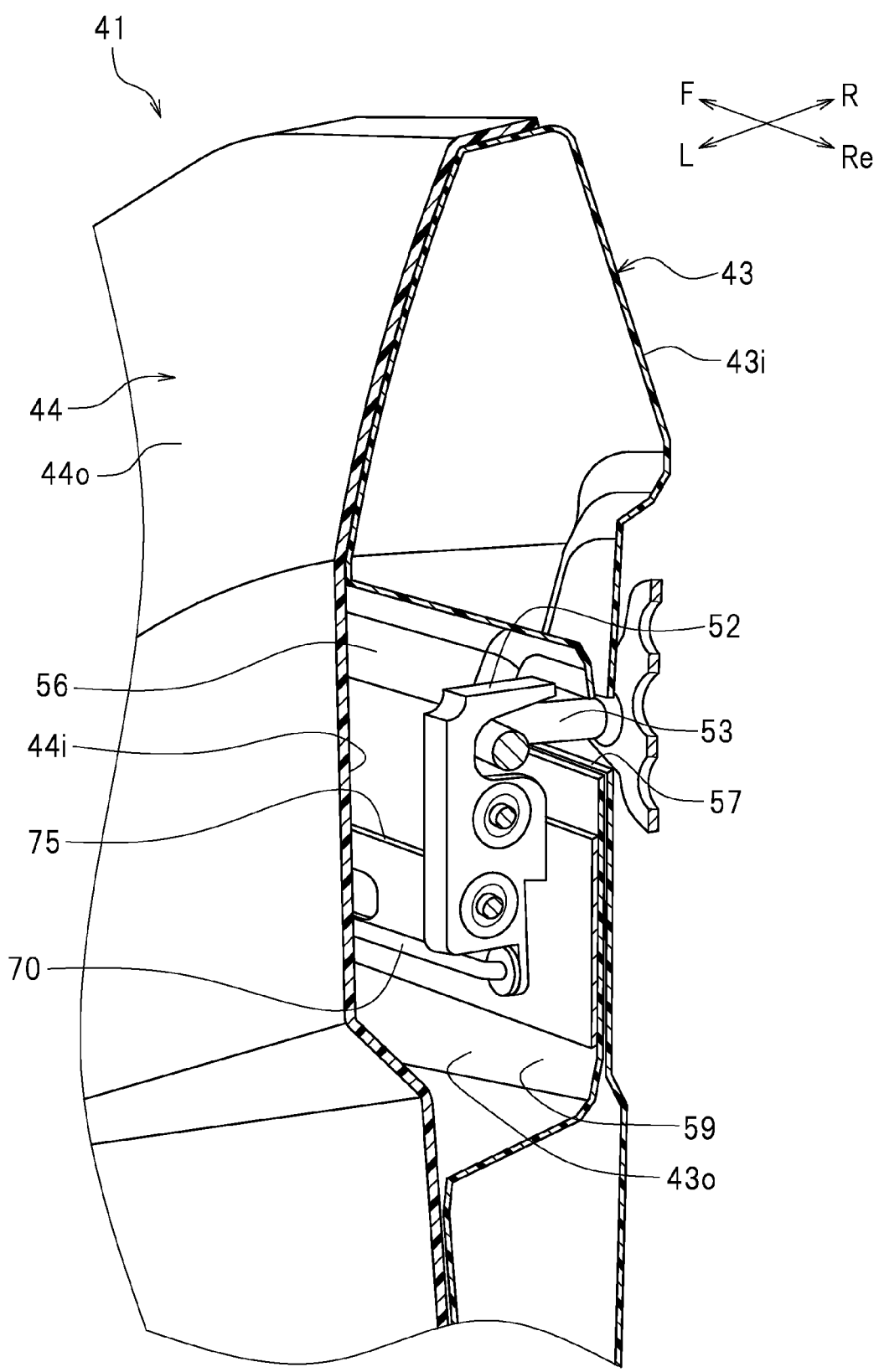
FIG. 9 is a perspective view including a cross section along IX-IX line of FIG. 5.

As shown in FIGS. 8 and 9, a gap space 56 is provided between the inner wall member 43 and the outer wall member 44. The support plate 75, the interlocking shaft 70, and the latch mechanism 52 are located in the gap space 56. That is, the support plate 75, the interlocking shaft 70, and the latch mechanism 52 are located between the inner wall member 43 and the outer wall member 44. In the present preferred embodiment, the opposing wall 43o of the inner wall member 43 includes a depressed portion 59. The depressed portion 59 is depressed toward the inside in the vehicle width direction. With the left door 41, the depressed portion 59 is depressed toward the right. The support plate 75, the interlocking shaft 70 and the latch mechanism 52 are located in the depressed portion 59 of the opposing wall 43o of the inner wall member 43.

As shown in FIG. 5, the latch mechanism 52 is provided in a rear portion of the door 41. The inner wall member 43 includes a hole 57 therein to receive the latch striker 53 when the door 41 is closed. The latch mechanism 52 is located outward in the vehicle width direction with respect to the hole 57. In the left door 41, the latch mechanism 52 is located leftward of the hole 57. When the door 42 is closed, the latch striker 53 passes through the hole 57. As a result, the latch striker 53 engages with the latch mechanism 52 at a position located outward in the vehicle width direction with respect to the hole 57.

As shown in FIG. 4, the door 41 includes a first upper edge 81, and a second upper edge 82 extending, at an angle with respect to the first upper edge 81, continuously from a rear end 81b. While the first upper edge 81 extends diagonally in an upper rear direction in the present preferred embodiment, it may extend horizontally or diagonally in a lower rear direction. While the second upper edge 82 extends diagonally in an upper rear direction in the present preferred embodiment, it may extend diagonally in a lower rear direction or horizontally. The second upper edge 82 has a steeper slope than the first upper edge 81. As shown in FIG. 5, at least a portion of the lever 60 is located under the second upper edge 82. In the present preferred embodiment, a portion of the lever 60 is located under the first upper edge 81 with the other portion of the lever 60 located under the second upper edge 82, and the rear end 81b of the first upper edge 81 is located over the lever 60. Note, however, that the entire lever 60 may be located under the second upper edge 82.

As seen from FIG. 4, the position of the second upper edge 82 is easily recognized from outside the door 41. The lever 60 is provided on the inner wall 43i of the door 41 and is not visible from outside the door 41. However, since at least a portion of the lever 60 is located under the second upper edge 82, it is possible to recognize the position of the lever 60 from outside the door 41 by seeing the position of the second upper edge 82 from outside the door 41.

In the present preferred embodiment, the door 41 also includes a third upper edge 83 located rearward of the second upper edge 82. While the third upper edge 83 extends from a rear end 82b of the second upper edge 82 diagonally in an upper rear direction in the present preferred embodiment, it may extend horizontally or diagonally in a lower rear direction. The second upper edge 82 has a steeper slope than the third upper edge 83. This makes it even easier to recognize the position of the second upper edge 82 from outside the door 41. Thus, one is able to more reliably recognize the position of the lever 60 from outside the door 41.

As described above, with the ROV 1 of the present preferred embodiment, the lever 60 and the latch mechanism 52 are linked together by the interlocking shaft 70 extending in the vehicle front-rear direction. With the ROV 1, the lever 60 does not always need to be located in the vicinity of the latch mechanism 52. This allows the lever 60 to be located relatively close to the front side while locating the latch striker 53 to engage with the latch mechanism 52 relatively close to the rear side. This allows the lever 60 to be located at such a position that the lever 60 is easily operated by a passenger seated in the seat 11 while locating the latch striker 53 at such a position that the latch striker 53 will not be in the way of a passenger getting on/off the vehicle. Where the lever 60 and the latch mechanism 52 are interlocked together via the pivotal movement of the interlocking shaft 70 about the central axis of the interlocking shaft 70, and where the interlocking shaft 70 is long, even a slight bend of the interlocking shaft 70 can cause the action of the lever 60 and the action of the latch mechanism 52 to be out of sync with each other. With the ROV 1 of the present preferred embodiment, however, the interlocking shaft 70 interlocks the lever 60 and the latch mechanism 52 together via its movement in the vehicle front-rear direction. In other words, the interlocking shaft 70 interlocks the lever 60 and the latch mechanism 52 together via its movement along the axial direction of the interlocking shaft 70. Therefore, even if the interlocking shaft 70 is somewhat bent, the action of the lever 60 and the action of the latch mechanism 52 will not be out of sync with each other. Therefore, even if the interlocking shaft 70 is long, the action of the lever 60 and the action of the latch mechanism 52 will not be out of sync with each other. With the ROV 1 of the present preferred embodiment, there is no restriction on the length of the interlocking shaft 70, thus allowing the position of the lever 60 to be determined with more freedom. The present preferred embodiment is directed to the ROV 1, in which the lever 60 to open/close the door 41 is provided on the inner side of the door 41, wherein the latch striker 53 is unlikely to be in the way of a passenger getting on/off the vehicle, and the lever 60 is easily operated by a passenger while being seated in the seat 11.

According to the present preferred embodiment, as shown in FIG. 8, the inner wall 43i of the door 41 includes the depressed portion 48, and the lever 60 is accommodated in the depressed portion 48. Therefore, the lever 60 is unlikely to project from the inner wall 43i of the door 41. It is possible to reduce the length by which the lever 60 projects from the inner wall 43i of the door 41. Therefore, the lever 60 is unlikely to be in the way of a passenger while the vehicle is running, for example.

Moreover, in the present preferred embodiment, the lever 60 is located closer to the outer wall 44o of the door 41 than the peripheral portion 49 of the depressed portion 48 of the inner wall 43i of the door 41. That is, the lever 60 is located in the depressed portion 48, and does not project inward with respect to the inner wall 43i. Therefore, the lever 60 will not be in the way of a passenger while the vehicle is running, for example.

As shown in FIG. 4, the door 41 includes the first upper edge 81 and the second upper edge 82 extending, at an angle with respect to the first upper edge 81, continuously from the rear end 81b of the first upper edge 81. Since the second upper edge 82 extends at an angle continuously from the first upper edge 81, the second upper edge 82 is easily recognized from outside the door 41. While the lever 60 is provided on the inner wall 43i of the door 41, at least a portion of the lever 60 is located under the second upper edge 82 as shown in FIG. 5. This allows the position of the lever 60 to be easily recognized from outside the door 41. When a passenger puts his/her hand inside the door 41 from outside the door 41 through the opening 50 (see FIG. 1), the passenger easily recognizes the position of the lever 60 and is able to easily operate the lever 60 from outside the door 41. Therefore, the absence of a lever on the outer wall 44o of the door 41 does not cause significant inconvenience.

As shown in FIG. 7A, the lever 60 includes the lever body 61 linked to the first link portion 71 of the interlocking shaft 70, and the support shaft 62 extending in the vertical direction and pivotally supporting the lever body 61. If the lever body 61 is pivotally supported by the support shaft extending in the vehicle front-rear direction, the lever body 61 may be difficult to operate for a passenger seated in the seat 11, depending on the difference in height between the seat 11 and the lever body 61. According to the present preferred embodiment, however, it is possible to actuate the latch mechanism 52 by pivoting the lever body 61 to the left and right. Therefore, a passenger is able to easily operate the lever 60 while being seated in the seat 11.

According to the present preferred embodiment, as shown in FIG. 7A, the lever body 61 includes the handle 61a extending forward of the support shaft 62. A passenger actuates the latch mechanism 52 by holding and pivoting the handle 61a. Therefore, a passenger is able to easily operate the lever 60 while being seated in the seat 11.

The door 41 of the present preferred embodiment includes the inner wall member 43 and the outer wall member 44. The door 41 is made by assembling together the inner wall member 43 and the outer wall member 44. According to the present preferred embodiment, the door 41 is preferably manufactured by attaching the lever 60 and the latch mechanism 52 to the inner wall member 43, and assembling together the inner wall member 43 and the outer wall member 44. Therefore, the door 41 is manufactured easily.

As shown in FIG. 8, the interlocking shaft 70 is located between the inner wall member 43 and the outer wall member 44. Therefore, the interlocking shaft 70 is protected by the inner wall member 43 and the outer wall member 44. In the present preferred embodiment, the opposing wall 43o of the inner wall member 43 includes the depressed portion

59, and the interlocking shaft 70 is located in the depressed portion 59. Therefore, the interlocking shaft 70 is protected more reliably.

While the inner wall member 43 and the outer wall member 44 are preferably each made of a resin material in the present preferred embodiment, there is no particular limitation on the materials of the inner wall member 43 and the outer wall member 44. Thus, it is possible to reduce the weight of the door 41. Also, in the present preferred embodiment, the inner wall member 43 and the outer wall member 44 are preferably made of different kinds of resin materials. According to the present preferred embodiment, it is possible to use a suitable resin material for each of the inner wall member 43 and the outer wall member 44, thus allowing a better door 41 to be made.

According to the present preferred embodiment, as shown in FIG. 2, when the door 41 is closed, the front end 60f of the lever 60 is located rearward of the front end 11f of the seat 11 and forward of the middle position 11c of the seat 11 in the vehicle front-rear direction. According to the present preferred embodiment, the lever 60 is located at a position such that the lever 60 is easily operated by a passenger seated in the seat 11. Therefore, a passenger is able to easily operate the lever 60 while being seated.

While preferred embodiments of the present invention have been described above, the preferred embodiments above are merely examples, and the present invention can be carried out in various other preferred embodiments.

Figure 10:
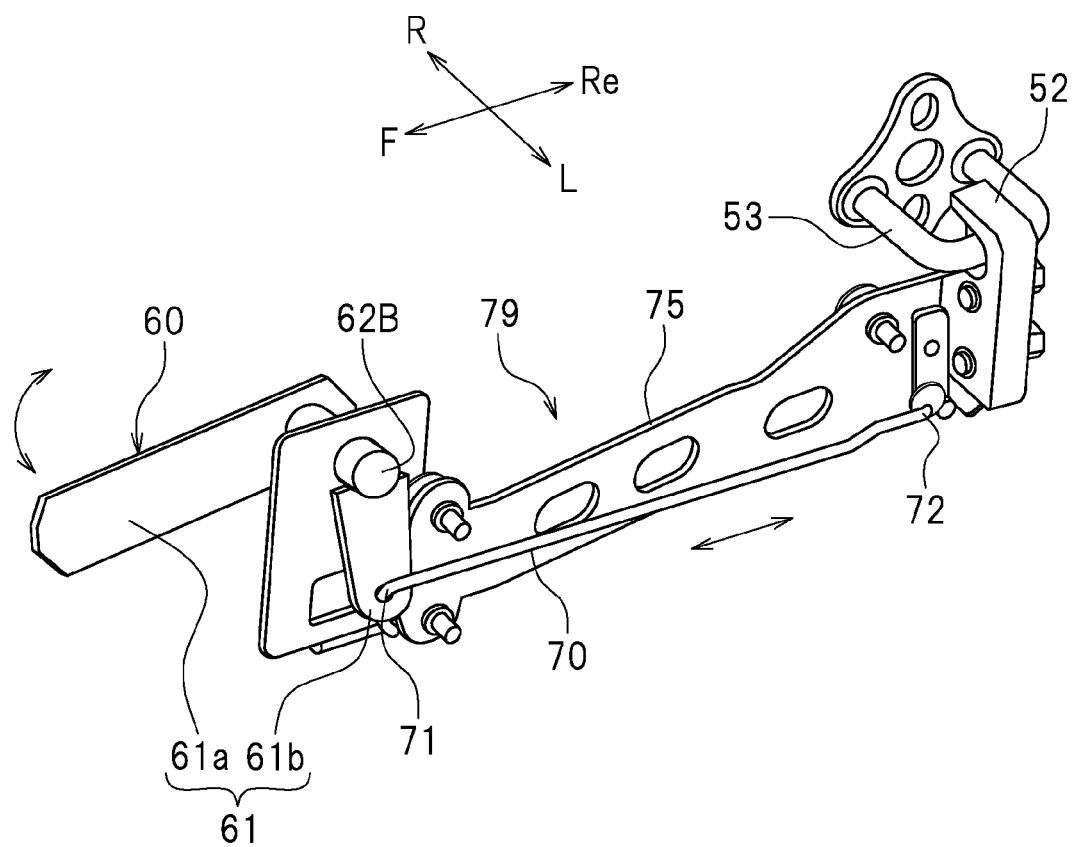
FIG. 10 is a perspective view showing a door lock unit according to another preferred embodiment of the present invention.

As shown in FIG. 7A, in the preferred embodiments above, the lever body 61 of the lever 60 is preferably pivotally supported by the support shaft 62 extending in the vertical direction. In the preferred embodiment above, the lever body 61 preferably pivots left and right. However, there is no particular limitation on the configuration of the lever 60. As shown in FIG. 10, the lever body 61 may be pivotally supported by a support shaft 62B extending in the vehicle width direction. The lever body 61 may be configured to pivot up and down. In the preferred embodiment shown in FIG. 10, as the lever 60 is pivoted upward about the support shaft 62B, the interlocking shaft 70 moves forward, thus releasing the engagement between the latch mechanism 52 and the latch striker 53. Then, when the lever 60 is released, the lever 60 pivots downward about the support shaft 62B due to the force of a spring (not shown), thus returning to the initial position shown in FIG. 10. This allows the latch mechanism 52 and the latch striker 53 to engage with each other. Such a lever 60 is also easily operated by a passenger while being seated in the seat 11.

Only the left door 41 has been described above, while the description of the right door 42 has been omitted. As stated above, the right door 42 and the left door 41 preferably have the same configuration except that they are left-right symmetrical with each other. However, the configuration of the left door 41 and the configuration of the right door 42 may be different from each other. For example, the lever 60 may be provided on the outer wall 44o for one of the left door 41 and the right door 42. The shape of the left door 41 and the shape of the right door 42 may be different from each other, and the structure of the left door 41 and the structure of the right door 42 may be different from each other.

While the door 41 preferably includes the inner wall member 43 and the outer wall member 44 in the preferred embodiments above, the door 41 may further include other members.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the present invention. These examples are described herein with the understanding that such examples are not intended to limit the present invention to the preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a seat for a passenger to sit in;
   an upper frame located over the seat when the vehicle is seen from a side, the upper frame extending in a vehicle front-rear direction;
   a door located under the upper frame and to a side of the seat, the door including an inner wall facing the seat and an outer wall located on an opposite side from the inner wall;
   an opening provided between the upper frame and the door when the vehicle is seen from the side;
   a hinge attached to a front end portion of the door, the hinge supporting the door so that the door pivots in a vehicle left-right direction;
   a latch attached to the door and releasable only from an inner wall side of the door;
   a lever pivotally attached to a portion of the inner wall of the door that is located above a middle position of the door in an up-down direction and forward of the latch; and
   an interlocking shaft extending in the vehicle front-rear direction and including a first link portion linked to the lever and a second link portion linked to the latch; wherein
   the interlocking shaft is configured to move in the vehicle front-rear direction when the lever is pivoted to interlock the latch;
   the first link portion and the second link portion are located at opposite ends of the interlocking shaft; and
   the outer wall of the door does not include a lever that releases the latch.

2. The vehicle according to claim 1, wherein the door includes a first upper edge and a second upper edge extending, at an angle with respect to the first upper edge, continuously from a rear end of the first upper edge; and
   at least a portion of the lever is located under the second upper edge.

3. The vehicle according to claim 1, wherein the lever includes a lever body linked to the first link portion of the interlocking shaft, and a support shaft extending in a vertical direction to pivotally support the lever body.

4. The vehicle according to claim 3, wherein the lever body includes a handle extending forward of the support shaft.

5. The vehicle according to claim 1, wherein the lever includes a lever body linked to the first link portion of the interlocking shaft, and a support shaft extending in a vehicle width direction to pivotally support the lever body.

6. The vehicle according to claim 1, wherein the door includes an inner wall member including the inner wall, and an outer wall member including the outer wall; and
the inner wall member and the outer wall member are assembled together.

7. The vehicle according to claim 6, wherein the interlocking shaft is located between the inner wall member and the outer wall member.

8. The vehicle according to claim 7, wherein the inner wall member includes an opposing wall opposing the outer wall member;
the opposing wall includes a depressed portion; and
the interlocking shaft is located in the depressed portion of the opposing wall.

9. The vehicle according to claim 6, wherein the inner wall member and the outer wall member are each made of a resin material.

10. The vehicle according to claim 6, wherein the inner wall member and the outer wall member are made of different kinds of resin materials.

11. A vehicle comprising:
a seat for a passenger to sit in;
an upper frame located over the seat when the vehicle is seen from a side, the upper frame extending in a vehicle front-rear direction;
a door located under the upper frame and to a side of the seat, the door including an inner wall facing the seat and an outer wall located on an opposite side from the inner wall;
an opening provided between the upper frame and the door when the vehicle is seen from the side;
a hinge attached to a front end portion of the door, the hinge supporting the door so that the door pivots in a vehicle left-right direction;
a latch attached to the door;
a lever pivotally attached to a portion of the inner wall of the door that is located above a middle position of the door in an up-down direction and forward of the latch; and
an interlocking shaft extending in the vehicle front-rear direction and including a first link portion linked to the lever and a second link portion linked to the latch; wherein
the interlocking shaft is configured to move in the vehicle front-rear direction when the lever is pivoted to interlock the latch;
the inner wall of the door includes a depressed portion;
the lever is attached to the depressed portion; and
the lever is located closer to the outer wall of the door than a peripheral portion of the depressed portion of the inner wall of the door.

12. A vehicle comprising:
a seat for a passenger to sit in;
an upper frame located over the seat when the vehicle is seen from a side, the upper frame extending in a vehicle front-rear direction;
a door located under the upper frame and to a side of the seat, the door including an inner wall facing the seat and an outer wall located on an opposite side from the inner wall;
an opening provided between the upper frame and the door when the vehicle is seen from the side;
a hinge attached to a front end portion of the door, the hinge supporting the door so that the door pivots in a vehicle left-right direction;
a latch attached to the door;
a lever pivotally attached to a portion of the inner wall of the door that is located above a middle position of the door in an up-down direction and forward of the latch; and
an interlocking shaft extending in the vehicle front-rear direction and including a first link portion linked to the lever and a second link portion linked to the latch; wherein
the interlocking shaft is configured to move in the vehicle front-rear direction when the lever is pivoted to interlock the latch; and
when the door is closed, a front end of the lever is located rearward of a front end of the seat and forward of a middle position of the seat in the vehicle front-rear direction.

* * * * *